(12) United States Patent
Bacci et al.

(10) Patent No.: US 8,882,858 B2
(45) Date of Patent: Nov. 11, 2014

(54) APPARATUS AND METHOD FOR THE PRODUCTION OF ELECTRIC ENERGY STORAGE DEVICES

(75) Inventors: Giancarlo Bacci, Sasso Marconi (IT);
Fabrizio Nanni, Sasso Marconi (IT);
Mauro Vaccari, Sasso Marconi (IT)

(73) Assignee: Manz Italy S.r.l. (IT)

( * ) Notice: Subject to any disclaimer, the term of this patent is extended or adjusted under 35 U.S.C. 154(b) by 176 days.

(21) Appl. No.: 13/697,541

(22) PCT Filed: May 4, 2011

(86) PCT No.: PCT/IB2011/051966
§ 371 (c)(1),
(2), (4) Date: Jan. 28, 2013

(87) PCT Pub. No.: WO2011/141852
PCT Pub. Date: Nov. 17, 2011

(65) Prior Publication Data
US 2013/0133184 A1 May 30, 2013

(30) Foreign Application Priority Data

May 14, 2010 (IT) .............................. MO2010A0147
May 14, 2010 (IT) .............................. MO2010A0148

(51) Int. Cl.
| | |
|---|---|
| *H01M 10/14* | (2006.01) |
| *H01M 10/04* | (2006.01) |
| *H01G 9/00* | (2006.01) |
| *H01M 10/0587* | (2010.01) |
| *H01M 10/0583* | (2010.01) |

(52) U.S. Cl.
CPC ...... *H01M 10/0409* (2013.01); *H01M 10/0468* (2013.01); *Y02E 60/12* (2013.01); *H01M 10/0404* (2013.01); *H01G 9/0029* (2013.01); *H01M 10/0587* (2013.01); *H01M 10/0583* (2013.01); *H01M 10/0431* (2013.01)
USPC ......................................................... 29/623.1

(58) Field of Classification Search
None
See application file for complete search history.

(56) References Cited

U.S. PATENT DOCUMENTS

| | | | | |
|---|---|---|---|---|
| 3,734,778 | A | * 5/1973 | Huf et al. ..................... | 29/623.1 |
| 2004/0154160 | A1 | * 8/2004 | Hong ............................. | 29/730 |
| 2006/0088759 | A1 | 4/2006 | Roh | |
| 2008/0280208 | A1 | 11/2008 | Naoi et al. | |

FOREIGN PATENT DOCUMENTS

| | | |
|---|---|---|
| WO | 02095858 A1 | 11/2002 |
| WO | 03100901 A1 | 12/2003 |

* cited by examiner

*Primary Examiner* — Patrick Ryan
*Assistant Examiner* — Wyatt McConnell
(74) *Attorney, Agent, or Firm* — Laubscher & Laubscher, P.C.

(57) ABSTRACT

Production apparatus and method for producing devices for storing electric energy are disclosed, wherein stacks of flat cathodes and anodes that face one another alternately with the interposition of a separator are produced, and in which the separator is formed by a single continuous strip folded several times in a single folding direction.

25 Claims, 18 Drawing Sheets

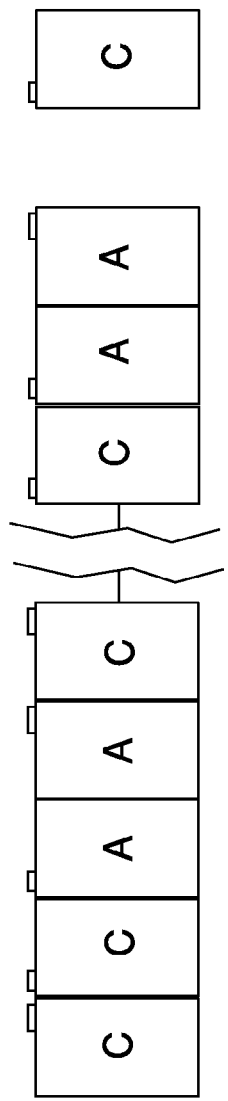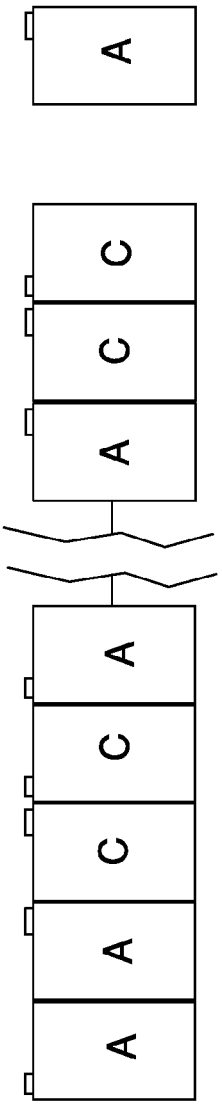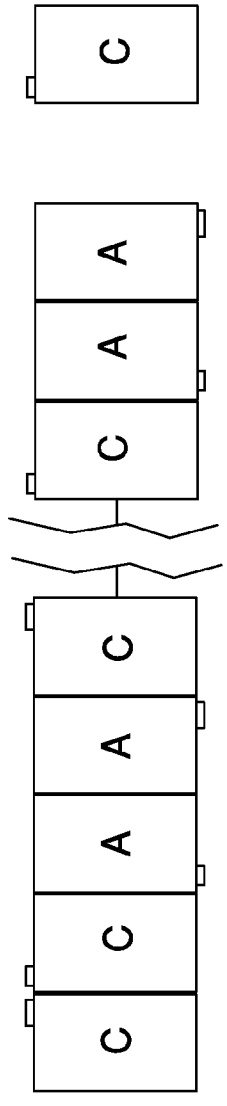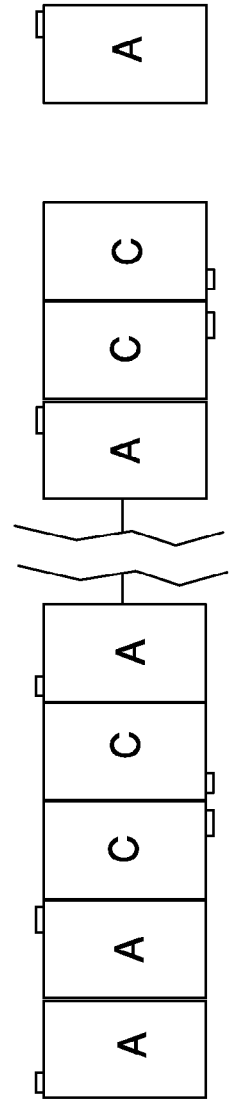

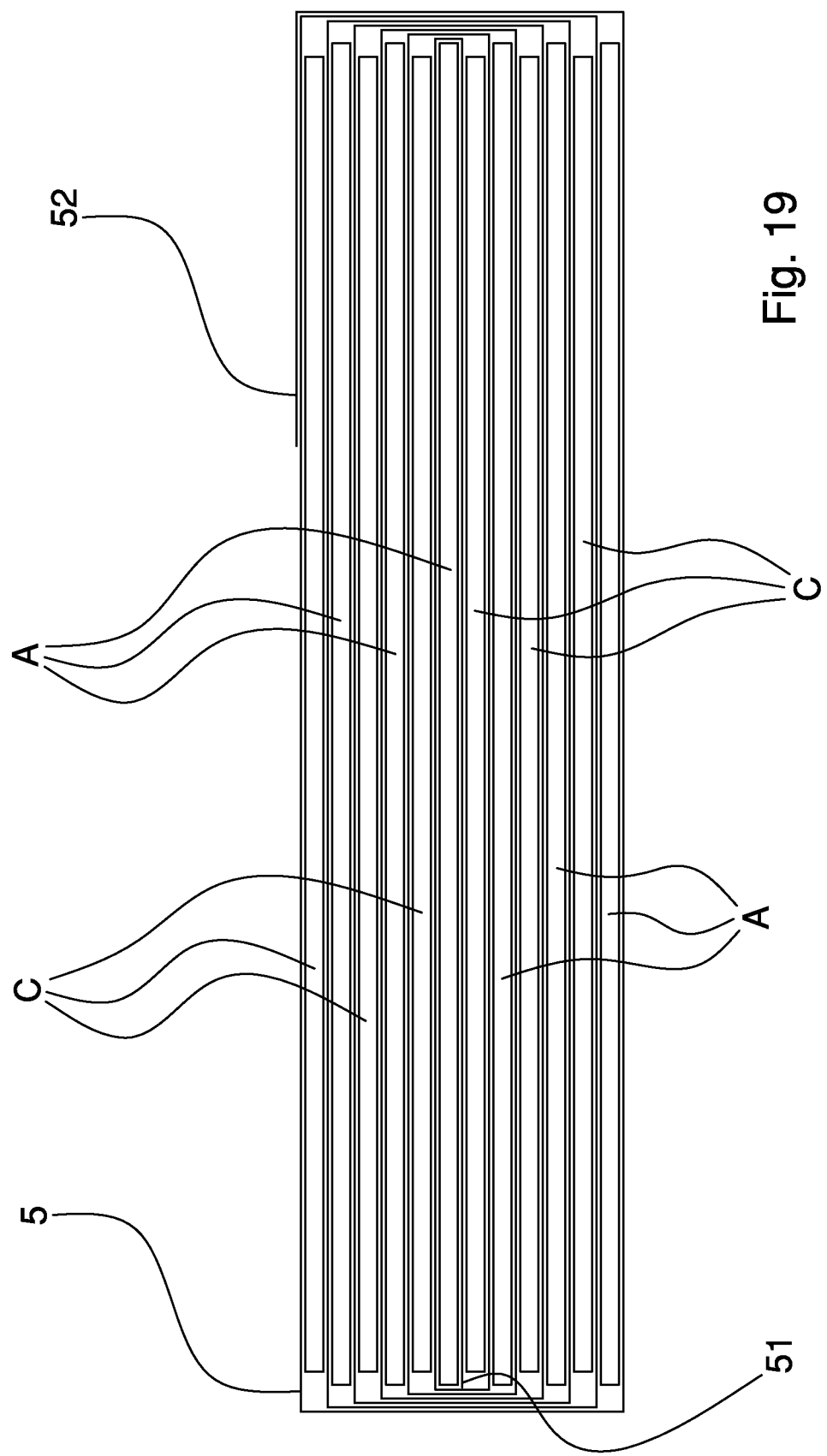

APPARATUS AND METHOD FOR THE PRODUCTION OF ELECTRIC ENERGY STORAGE DEVICES

This application is a §371 National Stage Entry of PCT International Application No. PCT/IB2011/051966 filed May 4, 2011. PCT/IB2011/051966 claims priority to IT Application No. MO2010A000148 filed May 14, 2010 and IT Application No. MO2010A000147 filed May 14, 2010. The entire contents of these applications are incorporated herein by reference.

BACKGROUND OF THE INVENTION

The invention relates to an apparatus and method for manufacturing devices for storing electric energy, in particular storage devices having a stack of cathodes and anodes that face one another alternatively with an interposed dielectric separator.

Specifically, but not exclusively, the invention may relate to the production of various types of storage devices—such as lithium batteries, electric double-layer capacitors, units for electrochemical treatment of liquids (for example oxygenators for water), electrostatic capacitors, fuel cells, etc—in which an electrode separator consists of a single continuous strip folded several times in the same folding direction.

Amongst known electric energy storage devices, lithium batteries are able to supply a relatively high voltage with an optimal energy-weight ratio. Various systems are known for manufacturing lithium batteries having a stack of flat cathodes and anodes that face one another alternatively and separated by a separator. In particular, producing a lithium battery with a separator consisting of a continuous single strip is known. In certain known manufacturing methods, adhesive means is used to join the electrodes to the separator, in particular on both the sides of a separating strip. In some embodiments forming the stack of electrodes by folding a separating strip several times in a zigzag is known; for example, using an apparatus is known that folds the strip in alternate directions ("z-folding"). A method is also known, for example from US 2006/0088759, for folding a separating strip in a single folding direction.

Patent publication WO 2002/095858 A1 shows an apparatus according to the preamble of claim 1. Patent publication WO 2003/100901 A1 shows a method according to the preamble of claim 14.

Systems known for manufacturing storage devices comprising a stack of electrodes that face one another and are separated by a separator consisting of a single continuous strip are improvable in various aspects.

In the first place, it is desirable to reduce the cost of manufacturing the storage device. Further, producing storage devices with relatively high capacity and performance is desirable. One of the drawbacks of assembling a stack of electrodes with the "z-folding" system is the reduced productivity. One of the drawbacks of the production of a storage device with a lamination system of the electrodes via adhesive means are the high costs (which are in particular due to the cost of the adhesive means) and the relatively low performance of the storage device (in particular because of the reduced ionic transfer between the electrochemical cells that is due to the adhesive means).

SUMMARY OF THE INVENTION

One object of the invention is to provide an apparatus and/or a method for producing devices for storing electric energy comprising a stack of electrodes facing and separated from one another by a continuous single strip.

One advantage is to produce energy storage devices in a simple and cheap manner.

One advantage is to make an apparatus and/or a method available that is able to produce devices for storing electric energy in a precise and reliable manner.

One advantage is giving rise to an electric energy storage device that is of simple construction and great reliability.

One advantage is to produce a storage device having a stack of electrodes assembled by folding a continuous separating strip in a single folding direction.

One advantage is to enable a stack of electrodes to be formed without the need to use adhesive means to maintain the electrodes in the desired position during assembly of the stack.

Such objects and advantages and still others are achieved by the apparatus and/or by the method of one or more of the claims set out below.

BRIEF DESCRIPTION OF THE DRAWINGS

The invention can be understood and implemented better with reference to the attached drawings, which show an embodiment thereof by way of non-limiting example.

FIGS. 4a to 4d are four top plan views that show four possible manners of arrangement of the electrodes (cathodes C and anodes A) along the advancing path in FIG. 3 (with the strip 5 below not shown for sake of clarity).

FIG. 19 is an enlargement of the already assembled stack in FIG. 17.

DETAILED DESCRIPTION

Figure 1:
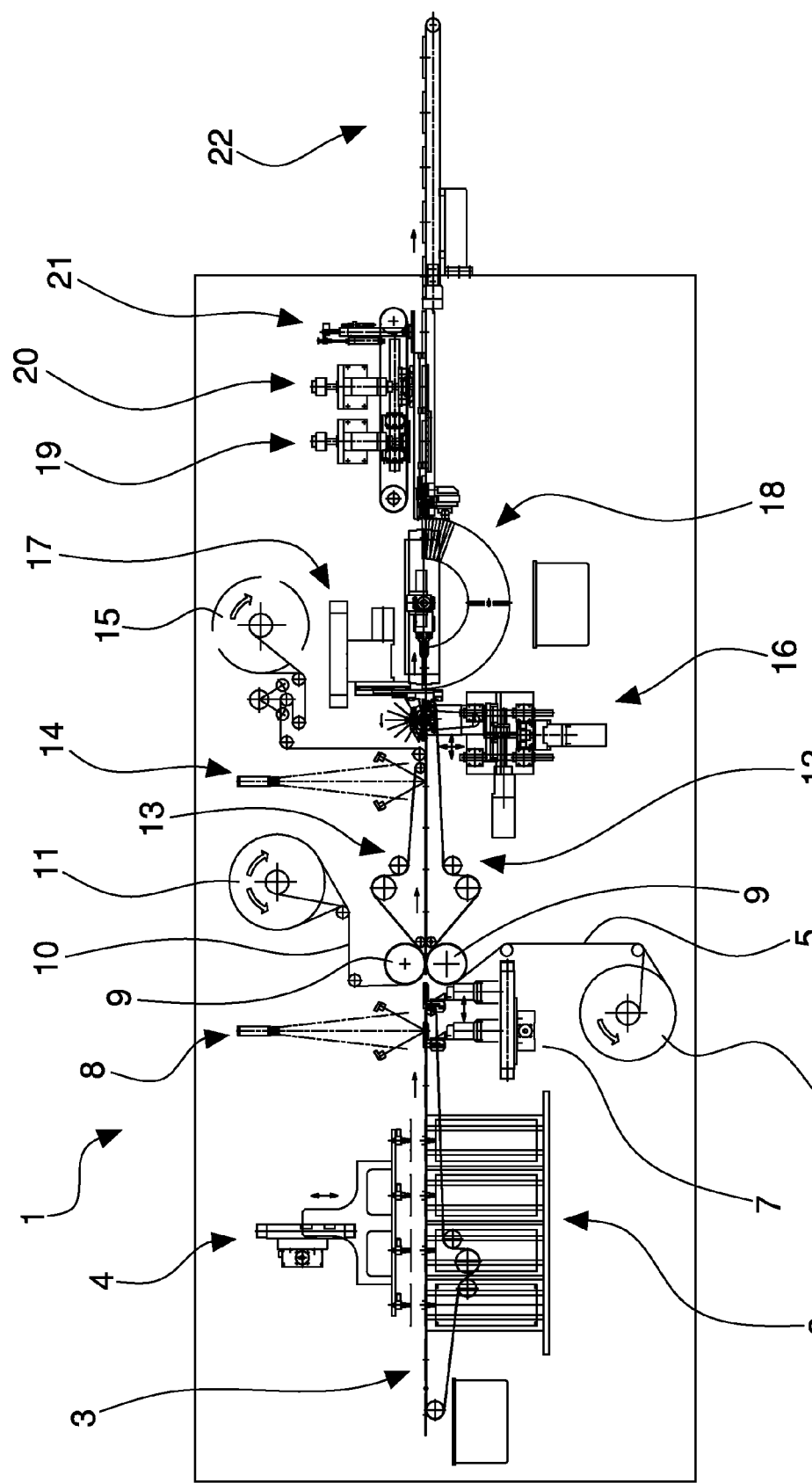
FIG. 1 is a diagram, in a vertical elevation, of an apparatus for manufacturing devices for storing electric energy.
Figure 2:
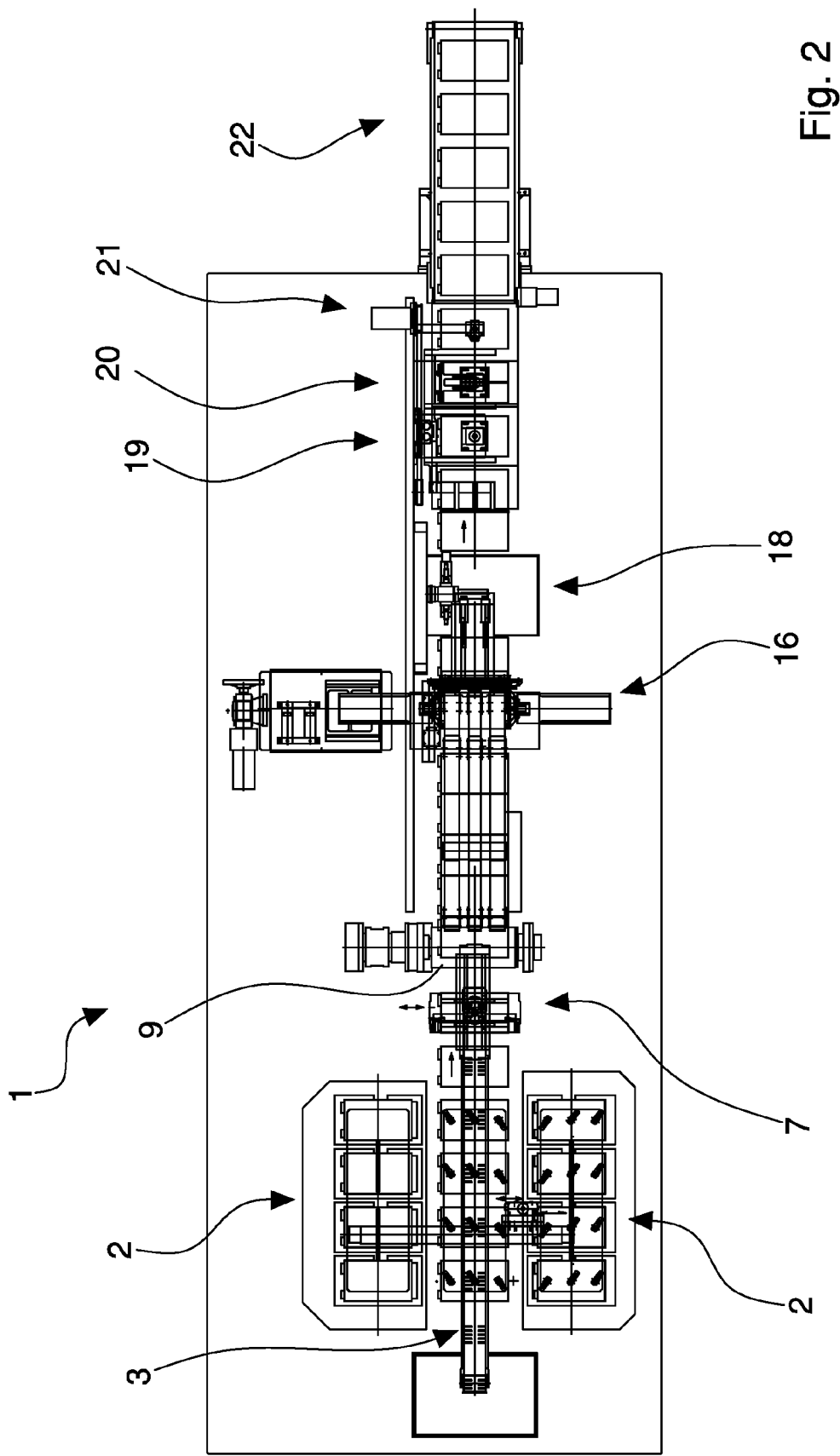
FIG. 2 is a top plan view of the apparatus diagram in FIG. 1.
Figure 3:
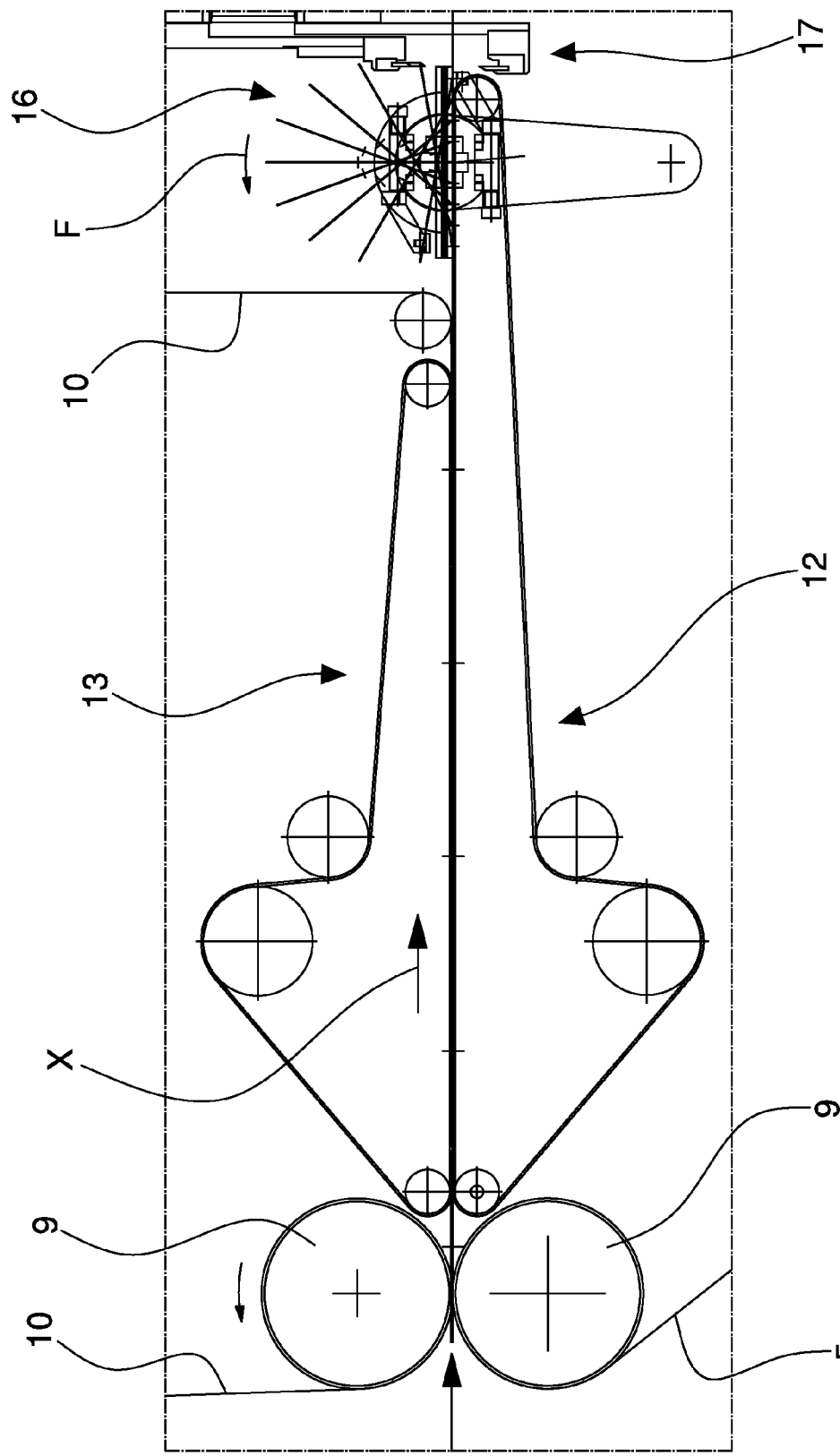
FIG. 3 is an enlarged detail of FIG. 1 comprising the advancing path of the separating strip 5 bearing the electrodes from the rollers 9 to the winding device 16 that forms the electrode stack and to the cutting device 17 that separates the stack formed from the rest of the strip 5.

With reference to the aforesaid figures, overall with 1 there has been indicated an apparatus for the manufacture of devices for storing electric energy comprising a stack of cathodes C and anodes A that alternate and face one another with an interposed separator.

With reference character 2 the magazines have been indicated where the electrodes (cathodes C and anodes A) are arranged that will form the stack of the storage device. With reference character 3 there has been indicated a conveying device (of known type) of the (flat) electrodes which may include, as in the specific case, a closed-loop flexible member (for example a conveyor belt). It is possible that, as in the specific case, the conveying device is provided with a pneumatic device for keeping the electrodes in position (via suction), such as, for example, a conveyor belt with a suction arrangement to make the electrodes adhere to the belt. With reference character 4 there has been indicated a loading device (of known type) to remove the electrodes from the magazines (also two or more electrodes at a time, in the specific case four electrodes at a time) and transfer the electrodes to the conveying device. The loading device 4 may include, as in the specific case, a transferring device of the "pick-and-place" type, which may operate, for example, with suction cups to take the electrodes from the magazines and deposit the electrodes on the conveyor belt.

With 5 a continuous strip has been indicated, which is made of dielectric material (of known type), which will act as a separator interposed between the electrodes inside the stack. The strip 5 is unwound, in a known manner, from a reel 6.

With reference character 7 there has been indicated an inserting device (of known type, for example of the gripper type) configured for removing the electrodes (cathodes C and anodes A) that advance supplied by the conveying device 3 and for placing the electrodes (cathodes C and anodes A) on the continuous separating strip 5 whilst the latter is unwound continuously from the reel 6. The inserting device 7 can be configured for transferring the electrodes one at a time by a reciprocating forward and backward movement (coordinated with an opening and closing movement of the gripping arrangement that grasps the electrode) between a position of withdrawing the electrode (from the conveying device 3) and a releasing position (to enable the electrode to be inserted and laminated on the strip 5). With reference character 8 there has been indicated a sensor (of known type) for detecting the position of the electrodes to be placed on the strip 5. The sensor 8 may include, as in the specific case, a sensor of optical type, for example a viewing system, that operates in an (end) zone of the conveying device 3. The sensor 8 and the inserting device 7 are connected to a control unit configured for controlling (in a known manner) the inserting device 7 on the basis of a signal emitted by the sensor 8, in such a way as to correct possible positioning errors of the electrodes. With reference character 9 there have been indicated rollers between which the continuous strip 5 is passed and between which the electrodes are also inserted (one by one).

With 10 there has been indicated a protective film (made of plastics) for protecting the electrodes arranged on the upper side of the advancing strip 5. The protective film 10 is unwound continuously from a reel 11.

With reference character 12 there has been indicated a supporting device of the continuous separating strip 5 that advances by bearing on the upper side the electrodes (cathodes C and anodes A according to a set sequence). The supporting device 12 may include a movable element that will define a (horizontal) movable supporting plane for supporting the strip 5. In particular, the supporting device 12 may include, as in the specific case, a closed-loop flexible member (for example a slidable supporting belt) having a driving arrangement for sliding the flexible member. The flexible member can have a (horizontal) upper branch configured for defining the (slidable) conveying plane on which the strip 5 bearing the electrodes can advance.

With reference character 13 there has been indicated a stabilising device that stabilises the electrodes carried by the continuous separating strip 5. This stabilising device operates, amongst other things, to enable undesired air to be evacuated that may remain interposed between the electrodes and the separating strip 5. The stabilising device 13 may include a sliding element that will define a (horizontal) plane parallel to and superimposed on the supporting plane defined by the supporting device 12. The stabilising device 13 may include, as in the specific case, a closed-loop flexible member (for example of the slidable belt type) having a driving arrangement for sliding the flexible member. The flexible member may have a lower (horizontal) slidable branch that is configured for cooperating with the (slidable) conveying plane in such a way as to exert slight stabilising (and air evacuating) pressure on the electrodes carried by the strip 5. This stabilising pressure can eliminate possible air bubbles between the electrodes and the separating strip 5. Between the electrodes on the strip 5 and the stabilising device 13 the protective film 10 is interposed, which is also slidable.

With 14 there has been indicated a sensor for detecting the position of the electrodes arranged on the separating strip 5. In particular, the sensor 14 is configured for measuring the distance between two consecutive electrodes. The sensor 14 may comprise, as in the specific case, a sensor of optical type, for example a viewing system, that operates on the advancing strip 5 bearing the electrodes. With 15 there has been indicated a reel for rewinding the protective film 10.

With 16 there has been indicated a winding device for forming the electrode stack (cathodes C and anodes A) from the product (supplied in the advancing direction X) formed by the strip 5 and by the electrodes C and A carried by the strip. The winding device 16 performs a series of overturnings of a stack P during the assembly step in such a manner as to wind the separating strip 5 around the electrodes C and A. At the start of stack assembly operations, the stack under construction will consist of a sole electrode (the first electrode of the arrangement of electrodes), which will be the first to be overturned. At the first overturning the first electrode will be overturned on an empty strip region (having dimensions that are such as to be able to receive an electrode, but are initially not occupied by any electrode). At the end of each successive overturning (performed, like the first, by performing a 180° rotation in the direction F around a movable rotation axis, still in the same overturning direction F, as will be better explained below), the stack under construction will be imposed on the subsequent electrode (cathode C or anode A) that will then be added to the stack under construction, which will then be overturned in the subsequent 180° rotation.

As said, the winding device 16 and the operation thereof will be disclosed in greater detail below. The sensor 14 and the winding device 16 can be connected to a control unit configured for controlling the winding device 16 on the basis of a signal emitted by the sensor 14, in such a manner as to take account of possible positioning errors of the electrodes, in particular of errors in the distance between two consecutive electrodes.

With 17 there has been indicated a cutting device, of known type, for separating the already assembled stack from the rest of the continuous separating strip 5. The cutting device 17 may comprise, as in the specific case, a blade and a counter blade that are movable in relation to one another and cooperate together for the transverse cut of the strip 5 to enable the already assembled stack to be detached and subsequently removed and the subsequent stack to be formed.

With 18 there has been indicated a transferring device (of known type) for transferring the stack that has already been assembled (and separated from the strip 5) to the subsequent work stations. The transferring device 18 may comprise a gripping member (for example of the gripper type) to grasp the stack. The gripping member can be movable (for example carried by an element rotating around a horizontal axis) in such a manner as to adopt a stack withdrawal position (for example immediately downstream of the cutting device 17) and a position of delivery of the stack to a conveying system. The delivery position can be, as in the specific case, rotated by 180° with respect to the withdrawal position. The conveying system can be configured for supplying the stacks that have already been assembled through a preset path along which possible further work stations are arranged, such as, for example, a welding station 19 of the separator, a station 20 for running an electric test, a station 21 for running a dimensional test, as far as an outlet 22.

In FIGS. 4a and 4b there are illustrated two possible manners of arranging the electrodes (cathodes C and anodes A) on the continuous separating strip 5 (which is not illustrated for the sake of clarity). In FIG. 4a, the first electrode of the row of electrodes with which the electrode stack will be formed is a cathode, followed by an empty space that is not occupied by an electrode, which is in turn followed by a succession of two anodes and two cathodes. In FIG. 4b, the first electrode of the row is an anode, followed by an empty space that is not occupied by an electrode, which is in turn followed by a succession of two cathodes and two anodes. In the specific case the electrodes are flat and rectangular. Between each electrode and the next electrode, a strip folding line is provided (only between the first and the second electrode are two folding lines provided that bound the empty strip space that is not occupied by an electrode). The distance between the electrodes is chosen in such a manner as to take account of the fact that, continuing with winding, the stack increases thickness, so this distance will increase progressively from the first to the last electrode of the sequence of electrodes. Each electrode has an electric terminal (or collector), for example in the shape of a tab protruding from a (short) side of the electrode. The arrangement of the electrodes on the strip 5 is made in such a way that, once the stack has been constructed, each anode A faces and alternates with a cathode C (with the interposition of a single layer of the separating strip), and in such a way that (in the examples of FIGS. 4a and 4b) the electric terminals of the anodes A are all aligned on one another on one part of a side of the stack, whilst the electric terminals of the cathodes C are aligned on one another and arranged on an opposite part of the side of the stack at a certain distance from the terminals of the anodes A. In the examples of FIGS. 4c and 4d, once the stack is assembled, the electric terminals of the anodes A will be aligned on one another on a side of the electrode, whilst the electric terminals of the cathodes C will be aligned on one another and arranged on the opposite side of the stack. It is possible to provide other manners of arranging the electrodes. In particular, it is possible to provide that between the first electrode and the second electrode there is no empty strip 5 portion, in which case the first electrode will already be supplied with a separating layer (for example a sheet of dielectric material), applied to the upper face of the electrode (this upper separating layer can be applied before placing of the electrodes on the strip 5, in the apparatus 1 or outside the apparatus 1, or can be applied by folding on the first electrode a front end portion of the strip 5 that is not occupied by an electrode).

The winding device 16 is illustrated in greater detail in FIGS. 5 to 16. The winding device 16 comprises a rotating support S (rotated during winding always in the same rotation direction indicated by the arrow F) around a (horizontal) rotation axis z-z that is perpendicular to the advancing direction of the strip 5 on the supporting device 12 (this rotation axis z-z being movable, as will be explained below). The rotating support S rotates two pressure devices that operate reciprocally on the stack P during assembly thereof. Each pressure device is configured for applying slight stabilising pressure to a side of the stack P during the assembly step (in particular the side where the last electrode is located that is added to the stack under construction during winding). Substantially, the pressure devices exert slight pressure to ensure adhesion and compaction between the separating strip 5 and the stack P being formed, so that the most advanced part of the strip is rotated during winding.

Figure 11:
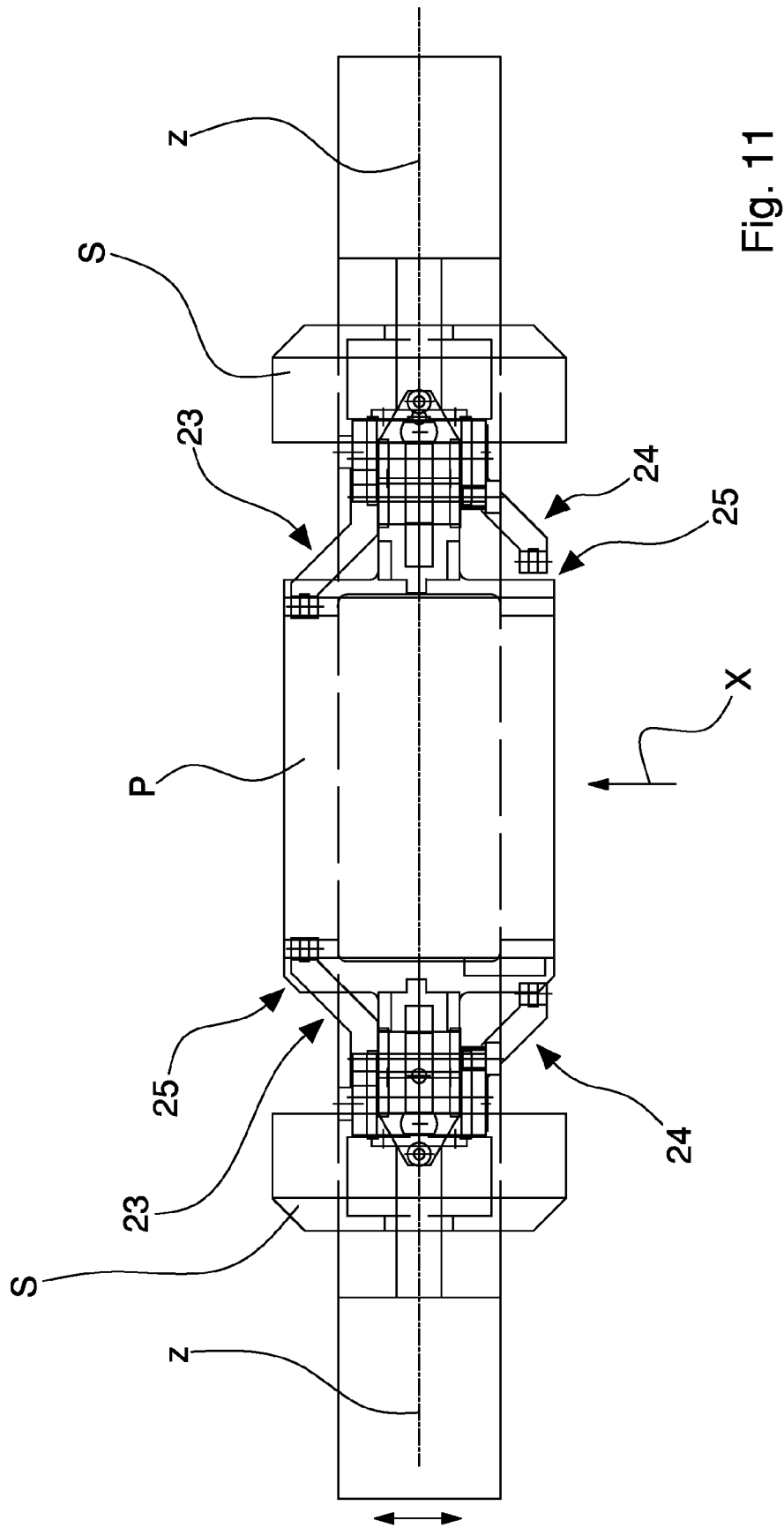
FIG. 11 is a top plan view of the winding device 16 of FIG. 9.
Figure 12:
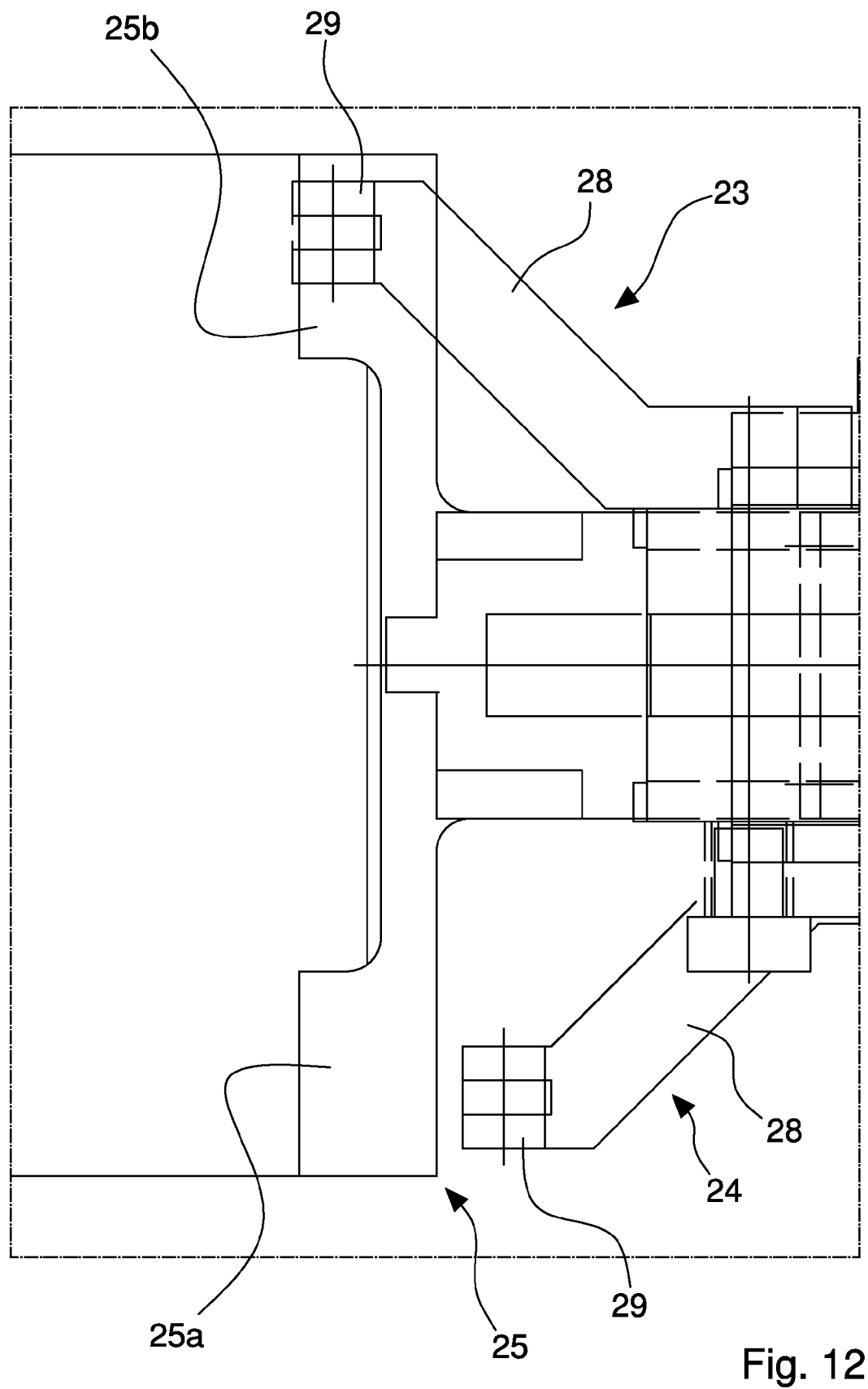
FIG. 12 is a detail of FIG. 11.
Figure 13:
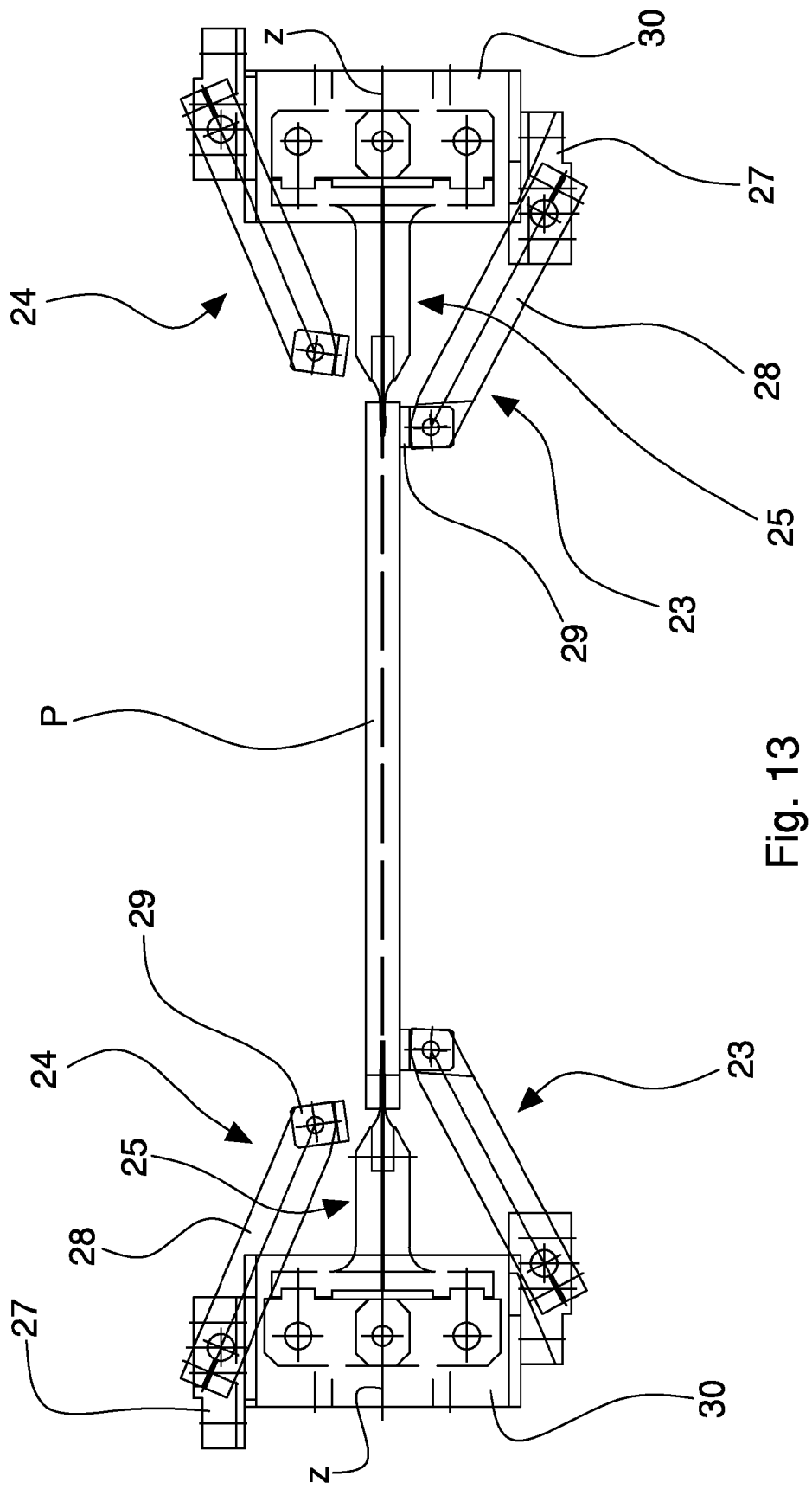
FIG. 13 is a frontal view of the winding device 16, like that of FIG. 9, at the end of assembly of the stack, before the gripping elements 25 have been removed from inside the stack by moving some operating members to the disengagement position.

The first pressure device comprises a first pair of pressure elements 23 and the second pressure device comprises a second pair of pressure elements 24. Each pair of pressure elements is configured for operating on side portions opposite the stack under construction P (FIG. 11).

The rotating support S further rotates a gripping device which is configured for taking the first electrode of the arrangement of electrodes on the strip 5. The gripping device can operate, as in the specific case, with a gripping mechanism of the gripper type. The gripping device may comprise a pair of gripping elements 25 operating on side portions opposite the first electrode (i.e. operating on opposite sides of the first electrode with reference to the advancing direction X of the strip 5). Each gripping element 25 may comprise, as in the specific case, two active portions 25a and 25b that operate on front and back end portions (with reference to the advancing direction X of the strip 5), of the respective side portion of the first electrode. The gripping elements 25 collaborate together to grasp the first electrode (together with the strip 5 portion below the first electrode) and to rotatingly drive the first electrode (together with the strip 5) during formation of the stack (i.e. during the various overturnings).

Figure 5:
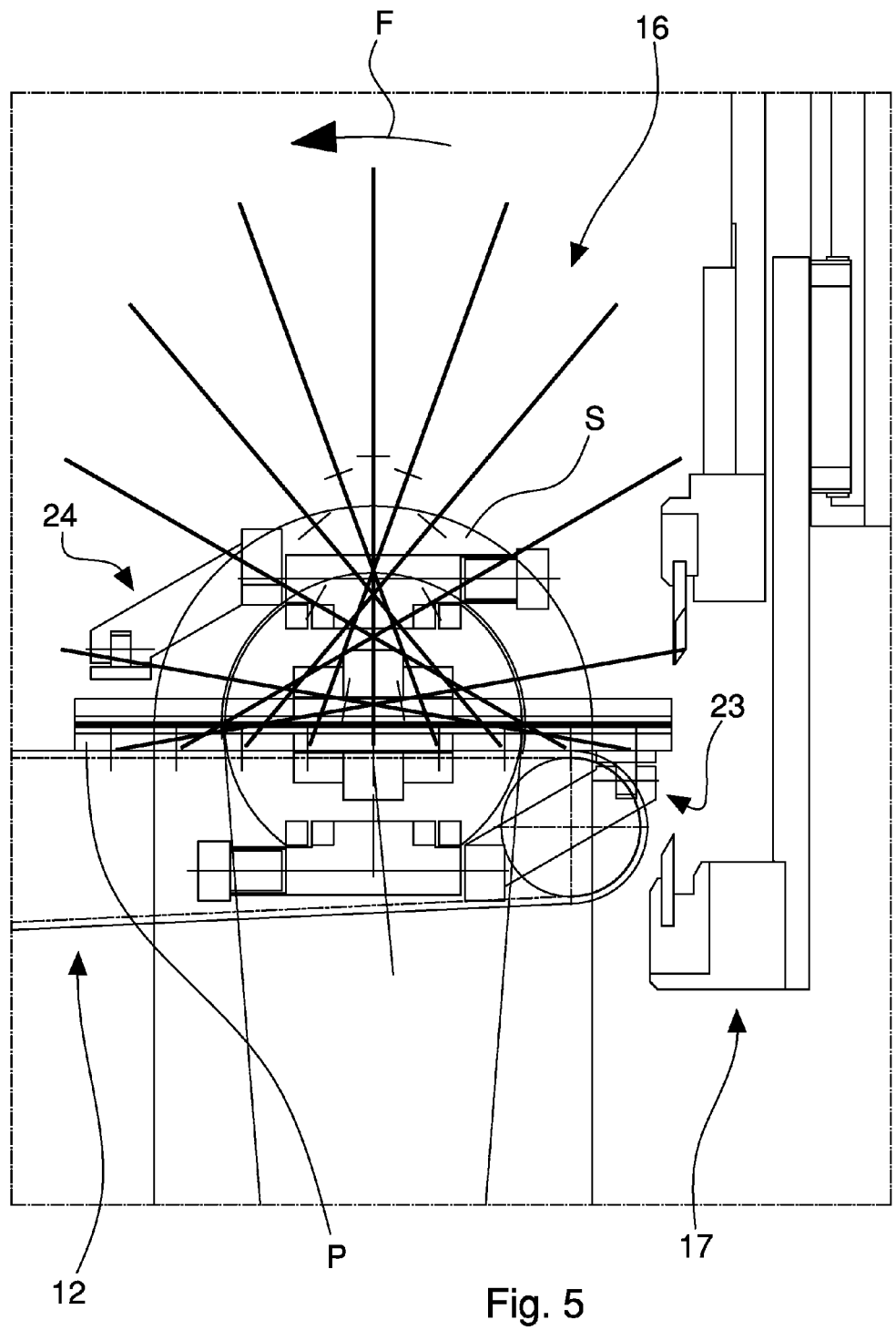
FIG. 5 is an enlarged detail of FIG. 3 comprising the zone where the winding device 16 for forming the electrode stack performs a series of overturnings of the stack P being formed by means of which the separating strip is wound around the electrodes.
Figure 6:
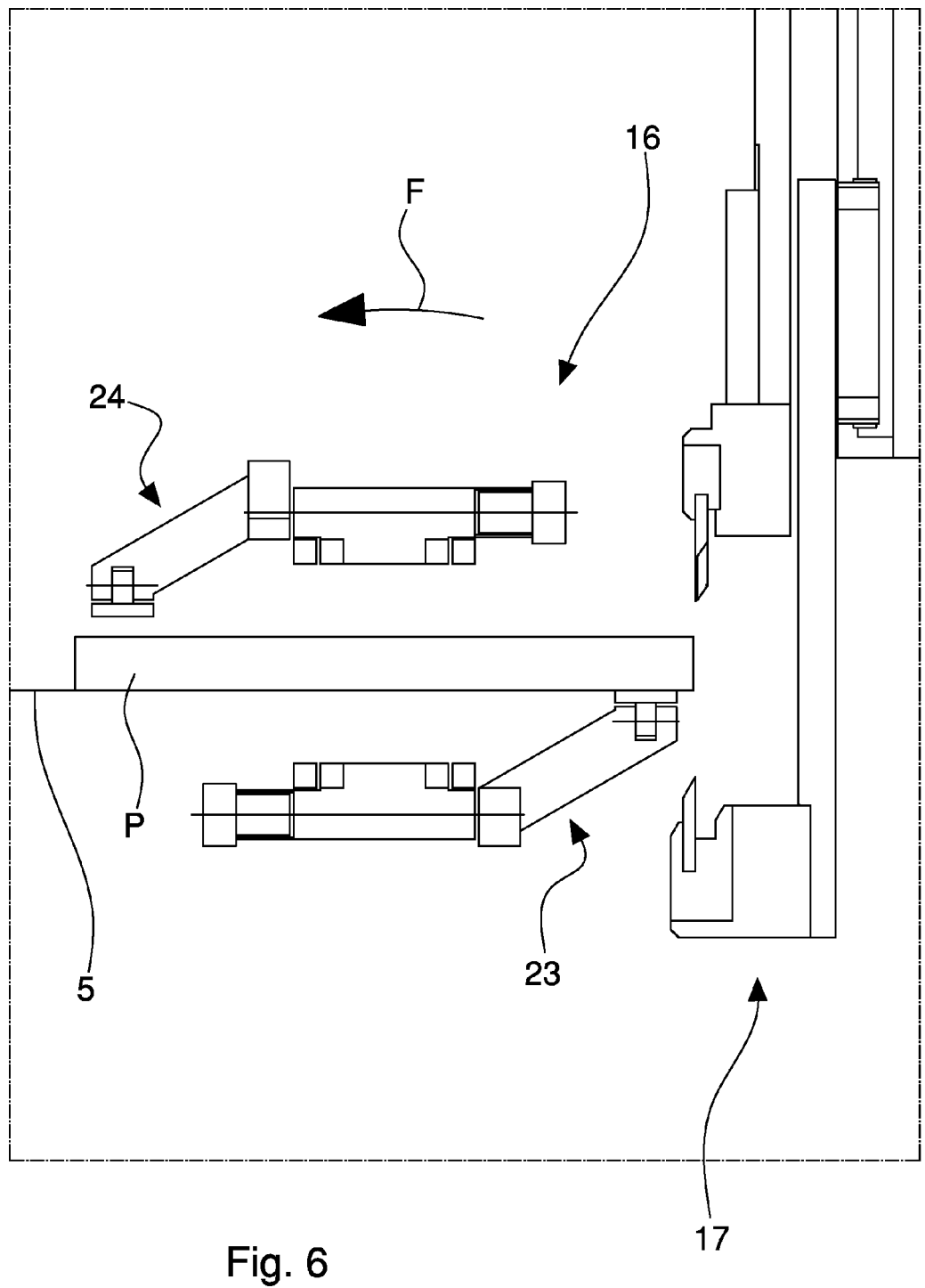
FIG. 6 is FIG. 5 from which some parts have been removed to show better the pressure elements 23 and 24, which contribute to the stability of the stack P being assembled during the overturning thereof, and the cutting elements (blade and counterblade) of the cutting device 17, that separate the already formed stack from the strip 5.
Figure 7:
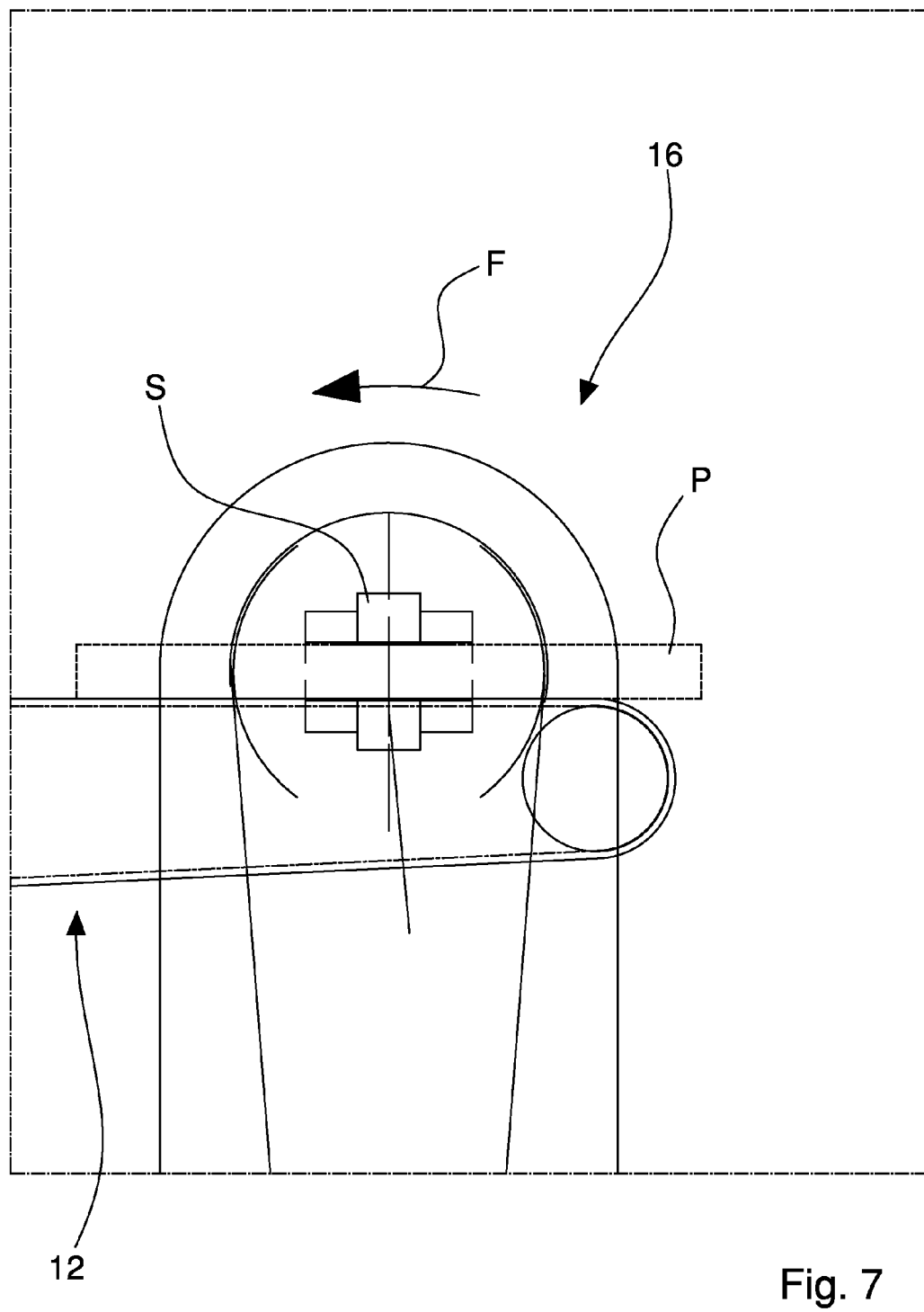
FIG. 7 is FIG. 5 from which some parts have been removed to show better the end portion of the supporting device 12 of the strip 5 bearing the electrodes A and C and a part of the rotating support (with a movable rotation axis) that rotates the members that overturn the stack P during assembly thereof.
Figure 8:
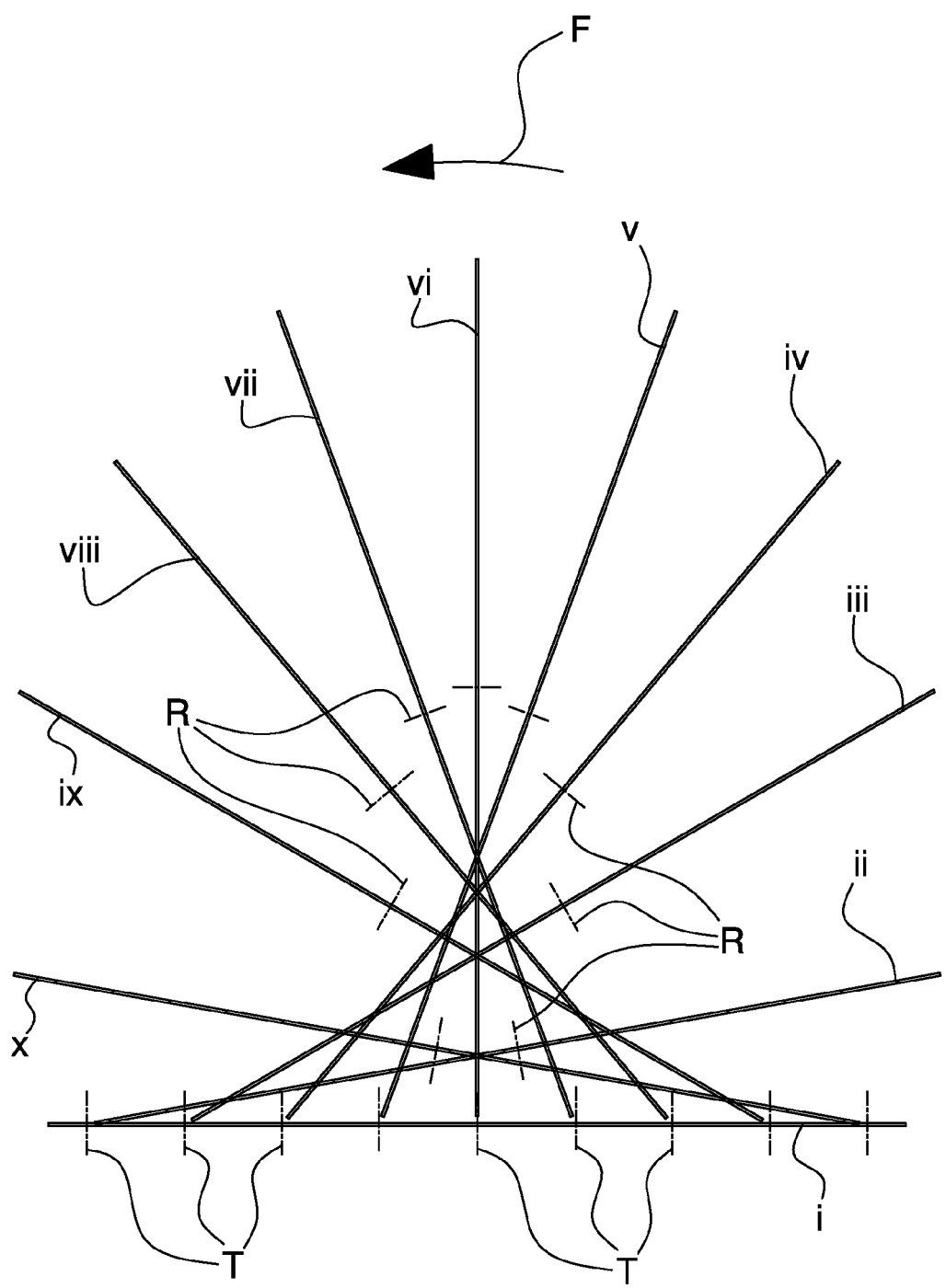
FIG. 8 is a diagram of a sequence of positions numbered i to x, adopted by the first electrode during the first overturning at the start of assembly of the stack P, to highlight the movement R of the median zone of the electrode and the movement T of the end of the electrode arranged near the folding line of the strip.
Figure 9:
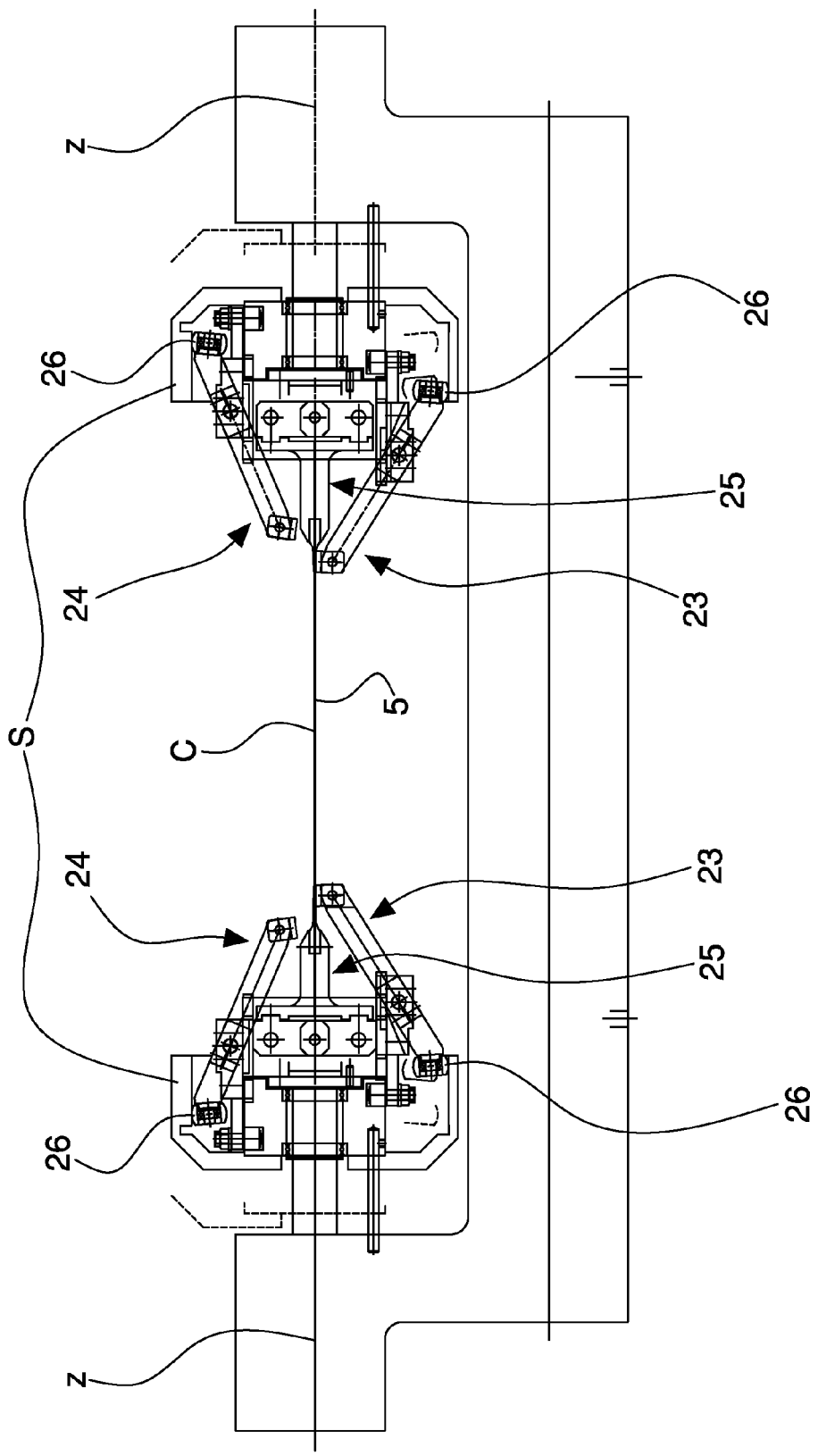
FIG. 9 is a frontal view of the winding device 16 at the start of assembly of the stack, with some dashed and interrupted lines that show the disengagement position of some operating members of the device at the end of the construction of the stack.
Figure 10:
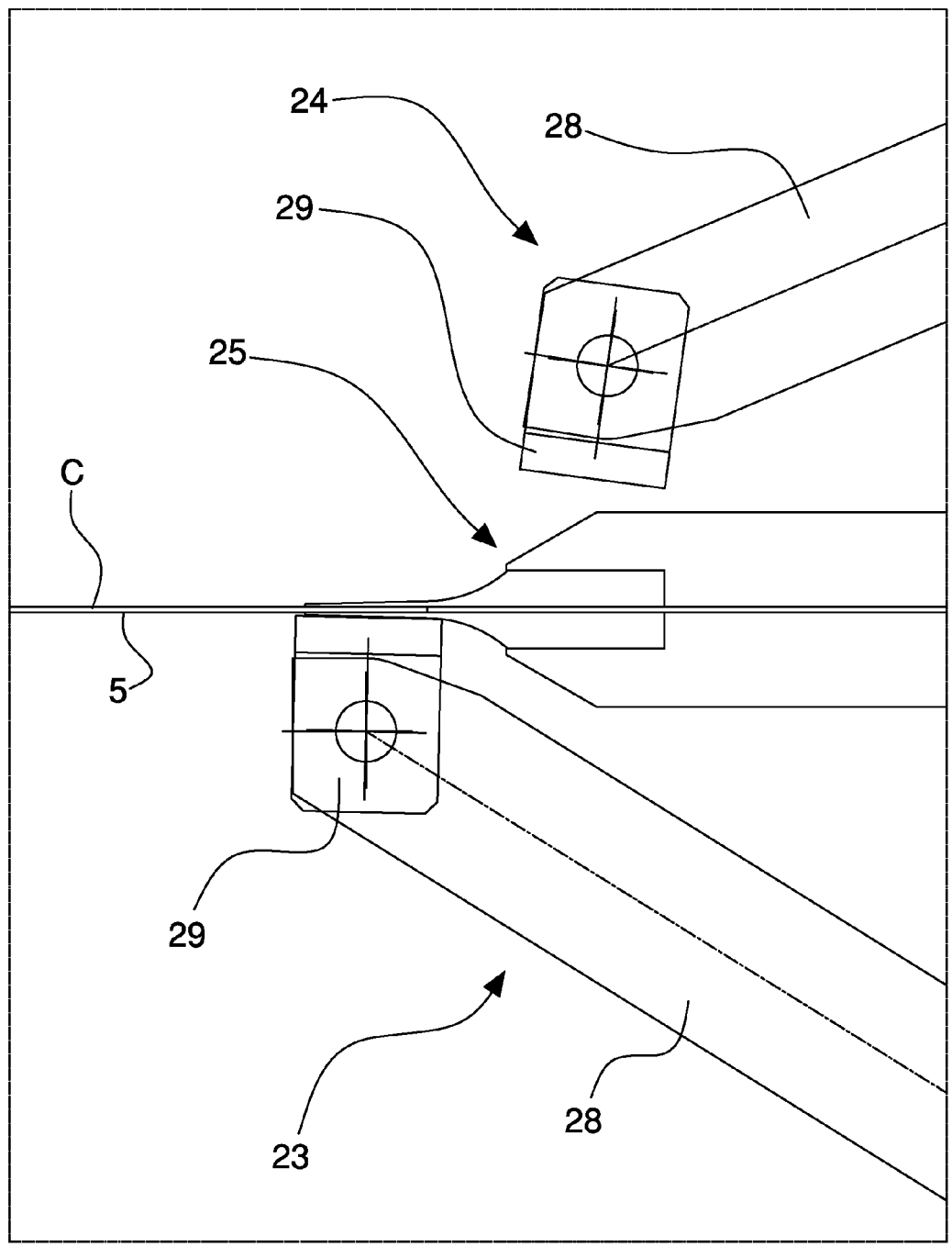
FIG. 10 is a detail of FIG. 9.

As said, the strip 5 that advances carrying the electrodes C and A is transformed in the stack P of electrodes by means of a series of overturnings (in direction F) of the stack under construction P. The stack P is assembled in the most advanced portion of the strip 5. In FIGS. 5 and 7 (with greater clarity in FIG. 8) there is illustrated the sequence of the positions (numbered with Roman numerals from i to x) adopted by the first electrode, at the start of assembly of the stack, during overturning thereof by 180°. The first electrode (together with the strip 5) is then grasped laterally by the gripping elements 25, whilst the pressure elements 23 press the strip 5 against the first electrode in such a manner as to ensure the compactness of the electrode-strip assembly. Both the gripping elements 25 and the pressure elements 23 are rotated in the direction F (and are carried by the support S). With R (FIG. 8) there are indicated the various positions adopted in sequence by the median axis of the first electrode during overturning from position i to position x. With T there are indicated the corresponding positions adopted in sequence, during overturning by 180°, by the end of the first electrode around which folding of the separating strip 5 occurs. The positions T correspond, substantially, to the positions adopted by the folding line of the strip 5 during overturning of the first electrode and, substantially, also for the subsequent electrodes, i.e. in the course of each subsequent overturning until the end of assembly of the stack.

Each successive overturning will comprise a folding (in the same folding direction) of the strip 5 around a respective folding line arranged between the stack P being assembled and the immediately subsequent electrode (i.e. the electrode that will be the lower electrode of the stack at the start of the subsequent overturning). At the end of each overturning in fact the stack being assembled P will be superimposed on the immediately subsequent electrode that will thus be part of the stack being assembled in the subsequent overturning. As said, folding of the strip 5 has a folding direction (shown by arrow F) that is the same for each overturning. It is seen clearly from FIG. 8 that during overturning the folding line (corresponding to position T) advances in the advancing direction of the strip 5, remaining substantially in the (horizontal) advancing plane defined by the product (strip 5 bearing the electrodes C and A) which advances, in such a manner as to avoid irregular movements (jolts) of the strip 5 that could modify the correct position of the electrodes C and A.

The rotating support S that rotates the gripping elements 25 and the pressure elements 23 and 24 can rotate by varying the position of the rotation axis z-z thereof, in particular in such a manner that the folding line (position T) of the strip 5 remains, at each overturning of the stack being formed, substantially in the strip 5 advancing direction X or in the advancing plane of the strip 5 (for example with the aim that the preset position of the electrodes arranged on the moving strip is not lost through irregular movements of the strip). In particular, the rotation axis z-z of the rotating support S will be able to perform a trajectory (orbit or at least partial orbit) having at least one of the trajectory portions with an ascending and descending vertical motion (transverse to the advancing direction X of the strip 5) and/or trajectory portions with horizontal motion (parallel to the advancing direction X of the strip) forwards and backwards (where forwards and backwards is defined with reference to the advancing direction X of the strip 5).

As said, during winding (i.e. the various overturnings by 180° of the stack under construction around the subsequent folding lines of the strip 5) the first electrode (i.e. the electrode that has been overturned first at the start of formation of the stack) is maintained grasped by the gripping device (comprising in this case the lateral gripping elements 25). The gripping elements 25 are provided with the possibility of disengaging from the stack assembled at the end of winding. The disengagement may comprise opening the gripping elements (for example in the case of gripping elements of the gripper type), with a slight movement in order not to damage the stack that has just been assembled in which the gripping elements are located, followed by a removal movement that may comprise, as in the specific case, reciprocal moving away of the two gripping elements 25 in a horizontal direction (in FIG. 9 there is indicated by a dashed line the position of reciprocal moving away of the two opposite rotating semi-elements that comprise the support S and support the gripping elements 25 and, also, the pressure elements 23 and 24).

Figure 14:
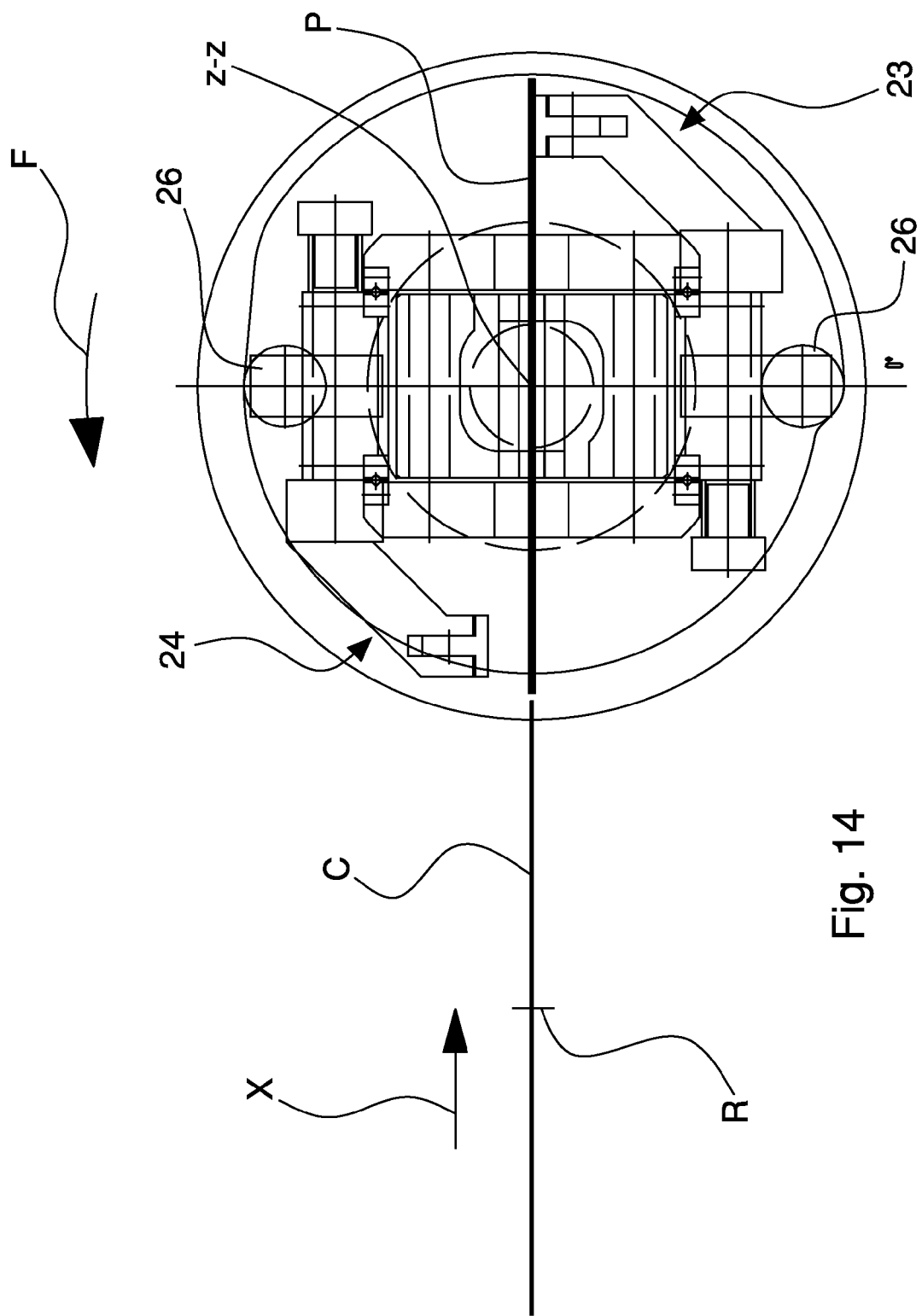
FIGS. 14 to 16 show three operating steps of the pressure elements 23 and 24.
Figure 15:
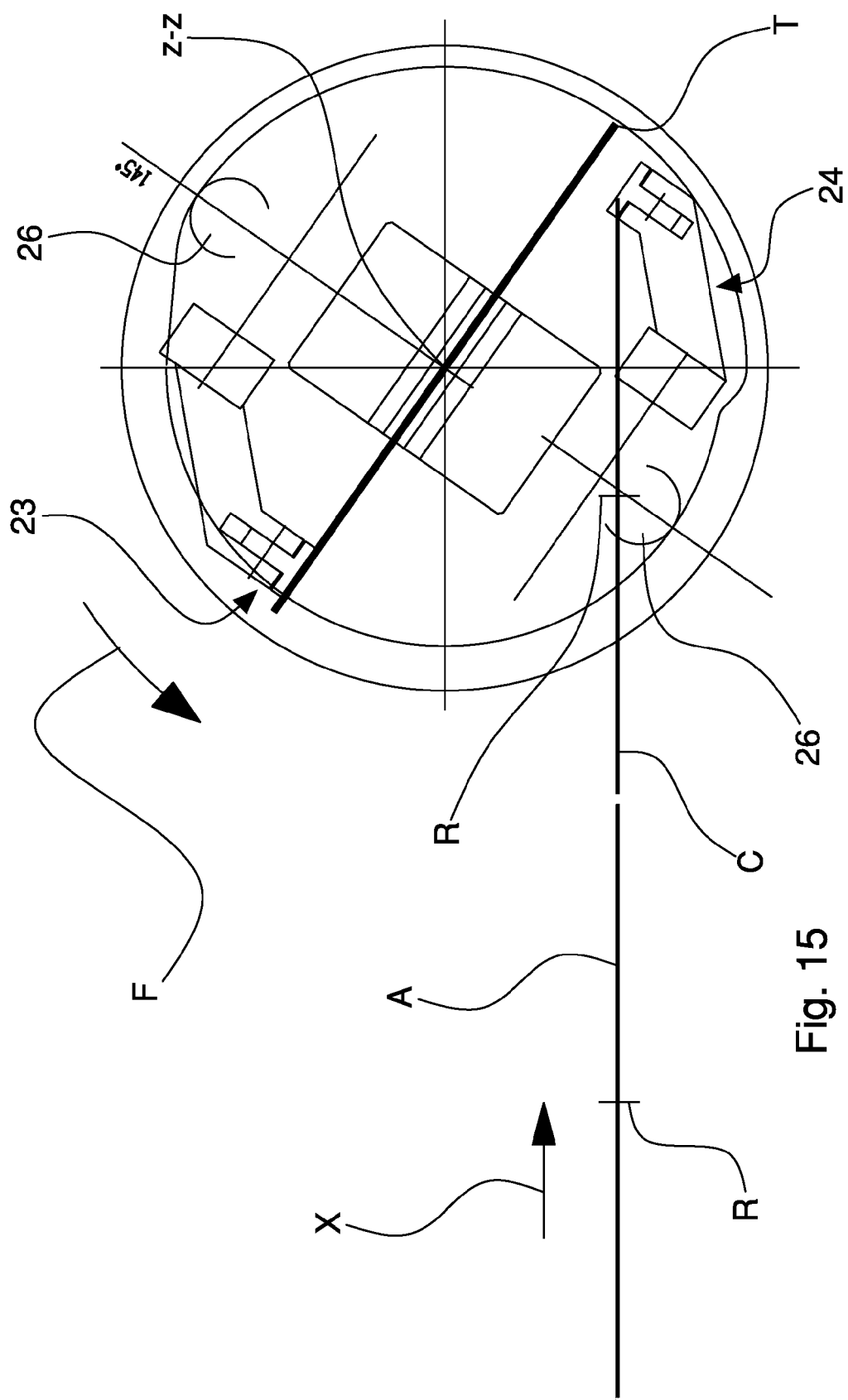
Figure 16:
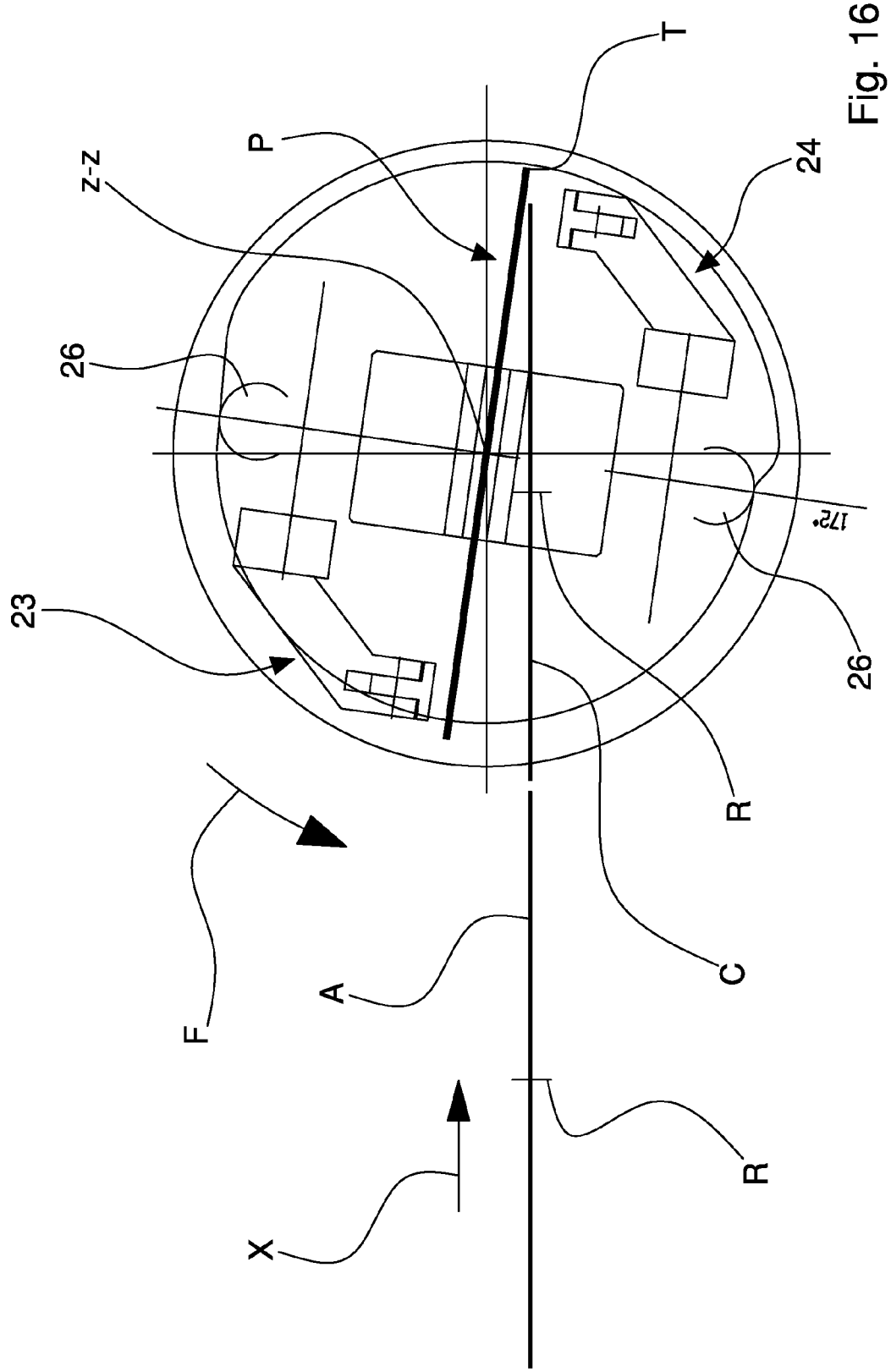
Figure 17:
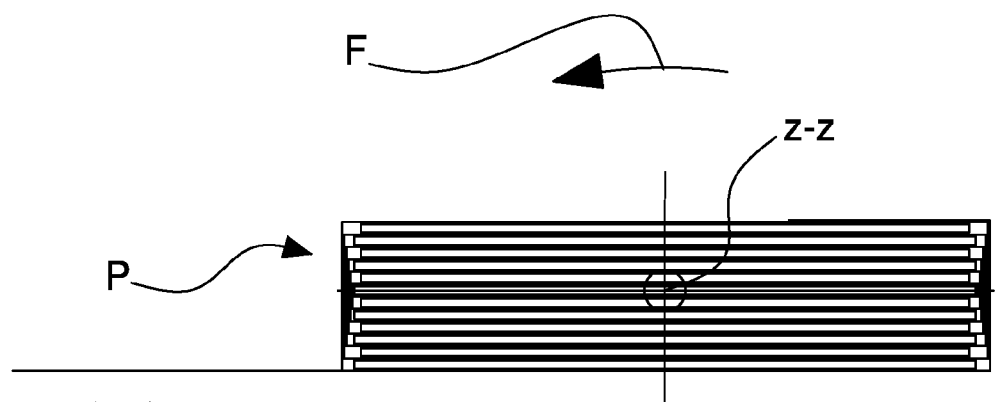
FIG. 17 shows the electrode stack with the rotation axis of the first electrode highlighted that, during assembly of the stack, is grasped and rotated by the winding device 16, and at the end of assembly of the stack, is located in the centre of the stack.
Figure 18:
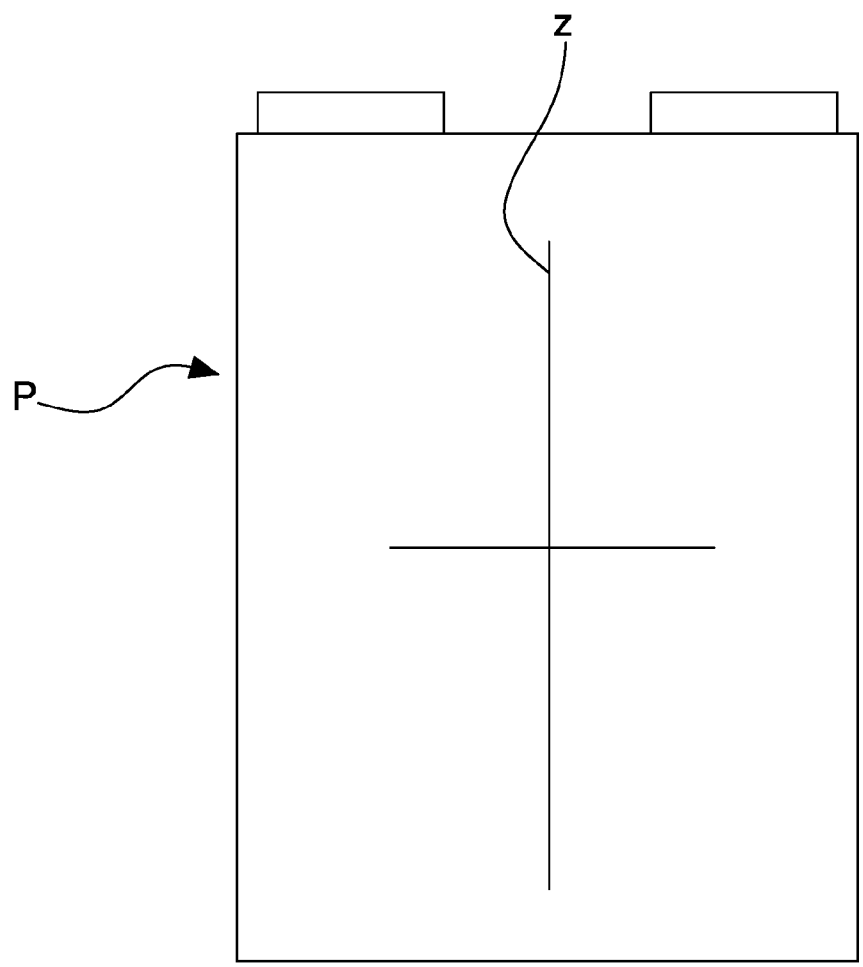
FIG. 18 is a top plan view of the stack in FIG. 17.

In FIGS. 14 to 16 there is illustrated schematically the operation of the pressure elements 23 and (in these figures the separating strip that advances in the advancing direction X has not been illustrated for the sake of greater clarity). At the start of overturning, one of the pairs of pressure elements (in the illustrated example the pair indicated by 23) operates on the front portion (with reference to the advancing direction X) of the stack P being assembled, by pressing from the bottom up. The first pressure elements 23 are commanded to adopt an active locking position (see FIG. 10 or 12) in which they can interact in contact with the stack P being assembled, whilst the second pressure elements 24 are in an inactive non-interference position (see FIG. 10 or 12) in which they do not interfere with the stack and can rotate without interfering with the separating strip.

In FIG. 15, after rotation by a set amount (greater than 90°, the same as, for example, approximately 145° as in the specific example), the first pressure elements 23 start to move towards the inactive non-interference position in which they do not interfere with the stack. In FIG. 16, after rotation by a set amount (greater than 90°, equal, for example, to about 172° as in the specific example), the second pressure elements 24 start to move towards the active or locking position in which they can interact in contact with the stack P under construction. After which, after a 180° rotation has terminated, it starts another overturning with the pressure elements 23 and 24 that operate reciprocally. The closing movement (towards locking) of a pressure element may be commanded after the opening movement (towards non interference) of the other pressure element, as in the specific example. The opening and closing movements of the pressure elements 23 and 24 can be driven mechanically, for example by a cam mechanism having a cam guiding profile with a circular base that is coaxial with the rotation axis z-z.

In FIGS. 14 to 16 the movement is clearly visible of the (horizontal) rotation axis z-z of the winding device in a (vertical) direction that is perpendicular to the (horizontal) advancing direction X of the separating strip 5.

In greater detail, each pressure element 23 or 24 comprises, in the specific example illustrated here, a carriage 27, an arm 28 and a contact member 29. The carriage 27 is coupled with the rotating support S and is movable (for example may comprise a slide that is slidable along sliding guides) in a direction that is parallel to the rotation axis z-z of the rotating support (to enable the rotating support to move towards or away from the side of the stack P). The arm 28 is pivoted on the carriage 27 around a rotation pivot (with an axis that is horizontal and transverse to the rotation axis z-z) with the possibility of moving towards or away from a (flat) face of the stack. The contact member 29 is an end element of the arm 28, configured for contact with the stack P being assembled. The contact member 29 can be coupled with the arm 28 by a rotation pivot. Each gripping element 25 may comprise a gripper carried by a further carriage 30 coupled with the rotating support S (for example a slide that is slidable along sliding guides). The further carriage 30 is movable in a direction that is parallel to the rotation axis z-z of the rotating support S, to enable, at the end of the formation of the stack, the removal of the gripper from the stack by moving away from the side of the stack.

In FIG. 19 there is illustrated the stack of electrodes C and A made with the apparatus and the method disclosed above. The various electrodes face one another. The cathodes C and the anodes A are arranged alternately. The dielectric separator comprises a single strip 5 wound around the electrodes, in which the initial end strip (shown with 51) of the strip is situated in the centre of the stack (near or interposed between the two most central electrodes inside the stack), and the final end strip (indicated by 52) of the strip is located outside the stack. The separating strip 5 is wound, from the initial end to the outside of the stack, always in the same winding direction.

The invention claimed is:

1. An apparatus comprising:
   a first supplying device for supplying a continuous strip;
   a second supplying device for supplying electrodes;
   an advancing device for forming a product and advancing the product in an advancing direction, the product comprising the continuous strip and an arrangement of the electrodes on a side of the continuous strip;
   wherein the apparatus comprises a winding device for winding the advancing product and assembling a stack of electrodes facing one another and separated by the continuous strip, said winding device comprising a gripping member configured to grip the first electrode of the arrangement of the electrodes together with a portion of the continuous strip on which the first electrode is arranged, said gripping member being further configured to rotate by performing a plurality of winding turns.

2. An apparatus according to claim 1, wherein at each winding half turn a further electrode of the arrangement of electrodes is added to the stack being assembled.

3. An apparatus according to claim 1, wherein said gripping member is configured to perform a plurality of winding turns maintaining the first electrode and the portion of strip gripped.

4. An apparatus according to claim 1, wherein said gripping member is configured to rotate by performing a plurality of winding turns around a rotation axis perpendicular to said advancing direction.

5. An apparatus according to claim 4, wherein said rotation axis is movable in at least a first direction that is transverse to said rotation axis and transverse to said advancing direction such that, during rotation of said gripping member, the stack being assembled has an end that is near the advancing product and that is movable without a motion component that is transverse to said advancing direction, such as the stack end is maintained substantially along an advancing plane defined by the advancing product.

6. An apparatus according to claim 5, wherein said rotation axis is movable in at least a second direction that is transverse to said rotation axis and parallel to said advancing direction.

7. An apparatus according to claim 1, wherein said winding device comprises a pair of pressure elements that are rotatable around a rotation axis and configured to press on one side the stack being assembled, each pressure element being provided with the possibility of assuming an active position and an inactive position wherein, respectively, it interferes and does not interfere with the stack being assembled, said winding device comprising a switching arrangement for switching said pressure elements between the active and inactive positions so as to alternate, at each half rotation turn, the pressure element that is active on the stack being assembled.

8. An apparatus according to claim 1, wherein said advancing device comprises a movable flexible member arranged to press on the arrangement of electrodes.

9. An apparatus according to claim 8, wherein said advancing device comprises a supplying device to supply a movable protective film interposed between the electrodes and said pressing movable flexible member.

10. An apparatus according to claim 1, wherein said advancing device comprises a further movable flexible member arranged for supporting the product in contact with a further side of the continuous strip opposite the side on which the arrangement of electrodes is located.

11. An apparatus according to claim 1, wherein said gripping member has two gripping elements configured to grip the first electrode on opposite sides.

12. An apparatus according to claim 11, wherein each gripping element has two grippers that are located on opposite sides of a rotation axis around which said gripping member rotates and are configured to grip the respective side of the first electrode to two zones that are spaced apart from one another and opposite with respect to said rotation axis.

13. An apparatus according to claim 1, wherein said advancing device, said first supplying device and said second supplying device are configured to arrange the electrodes in a row on the advancing continuous strip in such a way that the row comprises a succession of groups of electrodes, each group consisting of the sequence cathode-cathode-anode-anode, or anode-anode-cathode-cathode, the first electrode of the row being an anode, or respectively a cathode, that is separated from the rest of the succession of groups of electrodes by an empty portion of continuous strip of dimensions such as to be able to receive an electrode but which is not occupied by an electrode.

14. A method for producing an electric energy storage device, said storage device comprising a stack of cathodes and anodes that alternate with and face one another and are separated by a continuous folded strip, said method comprising the steps of:
   supplying in an advancing direction a product comprising said extended continuous strip and an arrangement of electrodes on a side of said continuous strip, said arrangement of electrodes comprising a sequence of cathodes and anodes arranged in said advancing direction;
   forming a first intermediate stack wherein the first electrode of said arrangement of electrodes is interposed between a first and second separating layer, at least said first separating layer comprising a portion of said continuous strip;
   overturning said first intermediate stack, said overturning comprising folding said continuous strip around a folding line arranged after said first intermediate stack so as to superimpose said first intermediate stack on a portion of product arranged after said first intermediate stack, said portion of product comprising the second electrode of said arrangement of electrodes, said superimposing forming a second intermediate stack that comprises said portion of product and said first intermediate stack;
   repeating said overturning step, each time for each electrode after the second, until said stack is assembled;
   wherein said product advances along an advancing plane, and in that, during said overturning step, said folding line advances in said advancing direction and in said advancing plane, wherein said first overturning step comprises taking the first electrode of said arrangement of electrodes by a rotating gripping member together with a portion of the continuous strip on which the first electrode is arranged.

15. A method according to claim 14, wherein:
said sequence of cathodes and anodes comprises at least two electrodes of a sign arranged one after the other, followed immediately by two electrodes of the opposite sign arranged one after the other;
said second separating layer comprises an end portion of said continuous strip;
said step of forming a first stack comprises overturning said end portion;
said supplying step comprises:
  i. arranging a movable element that exerts pressure on said side of product on which said arrangement of electrodes is present;
  ii. interposing a movable protective film between said electrodes and said pressing movable element; and
  iii. arranging a movable supporting element on a further side of said product opposite said side on which said arrangement of electrodes is present.

16. A method according to claim 14, wherein said second separating layer comprises an end portion of said continuous strip, and wherein said step of forming a first intermediate stack comprises overturning said end portion.

17. A method according to claim 16, wherein the first electrode of said arrangement of electrodes is arranged on said end portion of said continuous strip, and wherein said step of forming a first intermediate stack comprises overturning said end portion together with said first electrode so as to superimpose said first electrode on said portion of said continuous strip that forms said first separating layer.

18. A method according to claim 17, wherein, in said arrangement of electrodes, the first electrode has a positive or negative sign and is followed by said portion of continuous strip that will form said first separating layer and which is an empty portion of continuous strip that is able to receive a electrode but is not occupied by any electrode, the second electrode being subsequent to said empty portion and having an opposite side with respect to the sign of the first electrode, the third electrode after said second electrode having the same sign as said second electrode.

19. A method according to claim 14, wherein said sequence of cathodes and anodes comprises at least two electrodes of a sign arranged one after the other, followed immediately by two electrodes of the opposite sign arranged one after the other.

20. A method according to claim 14, wherein said supplying step comprises arranging a movable element that exerts pressure on said side of product on which said arrangement of electrodes is present.

21. A method according to claim 20, wherein said supplying step comprises interposing a protective film movable between said electrodes and said pressing movable element.

22. A method according to claim 20, wherein said supplying step comprises arranging a movable supporting element on a further side of said product opposite said side on which said arrangement of electrodes is present.

23. A method according to claim 14, wherein each of said repeated overturning steps comprises rotating each respective intermediate stack around a rotation axis that is transverse to said advancing direction, whilst said rotation axis is moved in a direction having at least one motion component that is transverse to said rotation axis and said advancing direction such that the end of the rotating stack that is adjacent to said folding line advances in said advancing direction being maintained along said advancing plane of said product.

24. A method according to claim 14, wherein, during subsequent repeated overturning steps, the first electrode is maintained gripped by said gripping member around which the stack is assembled.

25. A method according to claim 14, wherein each of said repeated overturning steps comprises providing at least one rotating pressure element that maintains the separating strip pressed against the last electrode of the stack.

* * * * *